(12) United States Patent
Kobayashi

(10) Patent No.: US 6,625,739 B1
(45) Date of Patent: Sep. 23, 2003

(54) HARD POWER SHUTDOWN OF A COMPUTER BY ACTUATING BOTH A KEYBOARD CONTROLLER INDEPENDENT KEY AND A SOFT POWER SWITCH TOGETHER TO BYPASS THE POWER SWITCH TOGETHER TO BYPASS THE POWER CONTROLLER

(75) Inventor: Yasuhiro Kobayashi, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 09/643,781

(22) Filed: Aug. 22, 2000

(30) Foreign Application Priority Data

Aug. 23, 1999 (JP) .......................................... 11-235650

(51) Int. Cl.[7] .............................................. G06F 1/26
(52) U.S. Cl. ......................................... 713/310; 341/22
(58) Field of Search ............................. 341/22; 713/310

(56) References Cited

U.S. PATENT DOCUMENTS

| | | | | |
|---|---|---|---|---|
| 5,530,878 A | * | 6/1996 | Bauer et al. ................. | 713/310 |
| 5,629,694 A | * | 5/1997 | Simon et al. .................. | 341/22 |
| 5,767,844 A | * | 6/1998 | Stoye .......................... | 345/212 |
| 5,850,546 A | * | 12/1998 | Kim .............................. | 713/1 |
| 5,935,254 A | * | 8/1999 | Lee ............................. | 713/340 |

FOREIGN PATENT DOCUMENTS

JP  01246615 A  * 10/1989  ............. G06F/1/00

OTHER PUBLICATIONS

Bob LeVitus, "Ask Dr. Mac #12.5 (Update)", MacCentral Online, Feb. 10, 1999.*

Brad Gibson, "Macworld NY: IS there a power button on the new keyboard?", MacCentral Online, Jul. 20, 2000.*

* cited by examiner

Primary Examiner—Thomas Lee
Assistant Examiner—Albert Wang
(74) Attorney, Agent, or Firm—Lawrence D. Cutter, Esq.; Kevin P. Radigan, Esq.; Heslin Rothenberg Farley & Mesiti P.C.

(57) ABSTRACT

To enable a power to the computer to be shut down in a simple configuration and independently of the status of the computer. The power switch 46 is set at the normal position while the computer 10 is operating. Each of the power, reset, and function signals is thus on the high level (A). When the function key 42A is pressed in that status, the function signal can be shifted to a low level signal so as to validate only the key 42A (B). While the power switch 46 is shifted to a pointed position and the key 42A is not pressed, only the power signal is validated, thus a power-on or power-off command can be issued (C). If the power switch 46 is set at a pointed position and the key 42A is pressed, then the level of the reset signal becomes low, thereby the reset signal is validated with the key 42A (D). Consequently, the power to the computer can be shut down forcibly if the power switch 46 is set at a pointed position and the key 42A is pressed, regardless of the status of the computer 10 operation.

7 Claims, 5 Drawing Sheets

HARD POWER SHUTDOWN OF A COMPUTER BY ACTUATING BOTH A KEYBOARD CONTROLLER INDEPENDENT KEY AND A SOFT POWER SWITCH TOGETHER TO BYPASS THE POWER SWITCH TOGETHER TO BYPASS THE POWER CONTROLLER

TECHNICAL FIELD

This invention relates, in general, to a computer provided with a power forced shutdown function, more particularly to a computer provided with a power forced shutdown function for shutting down the power thereof forcibly.

BACKGROUND OF THE INVENTION

Notebook model computers provided with a display and a keyboard respectively are excellent in portability. Such a computer detects whether or not a key is pressed through scanning of its key matrix including a plurality of predetermined keys provided on the keyboard.

Computers in recent years can use an OS or an application program to turn on or turn off their powers. For example, when such a notebook model computer is not used, the computer is usually set in a so-called energy-saving mode for minimizing the battery power consumption or shutting down its power supply. The OS or application program shifts the computer mode into the energy-saving mode automatically or in response to an instruction from the user.

Such a computer is also provided with a power switch respectively and the power switch is turned on/off to supply/shut down the power thereof. Many of those power switches are not used to supply and shut down the battery power and the AC power directly, thereby the OS or the application program can be used to manage the power to the computer as above described. More concretely, the computer is provided with a power circuit for supplying or shutting down the battery power and the AC power thereof, so that the power switch outputs a signal for directing power-on and power-off to this power circuit.

Consequently, a computer, when shutting down the power, detects a signal for directing power-off from the power switch or from the OS or the application program so as to control the power.

However, when the computer shuts down the power with an instruction from the user, a plurality of keyboard operations and a special hardware configuration have been required as predetermined in order to avoid erroneous operations.

In order to avoid such a problem, there is disclosed a technique for shutting down the power of a notebook model computer forcibly in any status (c.f. Published Unexamined Patent Application No. 10-307650). According to this technique, a key code for emulating a predetermined keyboard operation is output to the main CPU as a DATA signal, thereby shutting down the power. Because such a keyboard operation is output to the main CPU as a signal with use of an existing keyboard controller that emulates the keyboard operation, thereby controlling the power, the power is controlled without requiring any special hardware configuration.

However, in order to enable the power of a computer to be shut down by controlling the power with a signal output to the main CPU with use of an existing keyboard controller, the main CPU must be kept in the normal operation status.

More concretely, one of the OS and application programs must run normally in the computer. Sometimes, however, the OS or the application program is hung up in the computer. In such a case, because it is difficult to shut down the power of the computer by controlling the power as above described, such a complicated work as removal of the AC power supply and the battery power supply is needed to shut down the power.

This is why many computers are provided with additional components including a reset switch, which can shut down the power forcibly even when any of the OS and application programs is not running normally. And, addition of such a reset switch makes the power unit complicated. Especially, in the case of a notebook model computer, which is pressed for simplification in structure and reduction in cost, it has been strongly demanded to reduce the number of components to be mounted therein.

SUMMARY OF THE INVENTION

Under the above circumstances, therefore, it is an object of the present invention to provide a computer having a power forced shutdown function, which can shut down the computer power in a simple structure and without depending on the status of the computer.

The computer of the present invention, provided with a keyboard and a keyboard controller for converting a signal generated through scanning of a key matrix including a plurality of predetermined keys in the power-on status to a key code and transferring the key code to a processor, has a power forced shutdown function. The present invention thus enables the power to be shut down easily in the object computer allowing a special key being excluded from the key matrix including a plurality of predetermined keys and being included in the keyboard.

In the first aspect of the present invention, in a computer having a keyboard and a keyboard controller, the keyboard controller transforming a signal generated through scanning of a key matrix, including a plurality of predetermined keys in a power-on status, to a key code and transferring the key code to a processor, there are included: a power switch shiftable between a normal position and a pointed position, the switch outputting a signal representing a turn-on or a turn-off of the computer in response to a shift of the power switch to the pointed position; a power circuit supplying or intercepting power voltage in response to the signal transferred from the power switch; and a special key being excluded from the key matrix and being included in the keyboard, the key outputting a signal representing a power forced shutdown by being depressed in conjunction with the shift of the power switch to the pointed position.

In the present invention, a keyboard means an input device built in such a computer as a notebook model one beforehand as a component of the computer body. It is a hardware unit used for part of the input function of the computer. This keyboard includes a plurality of keys disposed as predetermined, for example, so as to conform to the JIS-based key disposition, etc. Recently, the keyboard is often provided with special keys for certain functions and function keys to which the user can assign his/her desired functions.

In the above described first aspect, the computer is provided with a keyboard controller for converting a signal generated through scanning of a key matrix including a plurality of predetermined keys provided on the keyboard in the power-on status to a key code and transferring the key code to the processor. Which key of the keyboard is pressed can be judged by scanning the key matrix. The computer is also provided with a power switch shiftable between a normal position and a pointed position and used to output a signal representing power-on or power-off of the computer in response to the shift of the switch to a pointed position. The power circuit supplies or shuts down the power voltage in response to a signal from this power switch. The keyboard includes a special key which is not included in the key matrix. The special key, when pressed in accordance with the shift of the power switch to a pointed position, outputs a signal representing a power forced shutdown. Consequently, the signal representing the power forced shutdown can be output in response to a depression of the special key while the power switch is shifted to a pointed position. Consequently, the signal representing the power forced shutdown is entered to the power circuit directly even when none of the OS and application programs is running normally in the computer. The power voltage can thus be shut down forcibly. There is thus no need to add such a new hardware device as a reset switch to the configuration of the computer.

The power circuit is configured by a logic circuit for outputting a signal directing supply or shutdown of a power voltage in response to a signal from the power switch and a power driving circuit for generating the power voltage and for supplying or shutting down the power voltage in response to the instruction signal, and said signal representing said power forced shutdown is entered to said power driving circuit. More concretely, the power circuit needs such a unit as a keyboard controller for converting a signal generated through scanning of a key matrix to a key code and transferring the key code to a processor, but the unit requires no actual part for supplying and shutting down the power voltage. More concretely, such a part should preferably be separated from the power circuit. In such a case, the logic circuit is in charge of such processings as scanning of the key matrix, as well as outputting of a signal for directing turn-on or turn-off of the power voltage in response to a signal from the power switch. And, the power driving circuit is in charge of the function for generating a power voltage and supplying or shutting down the power voltage in response to a instruction signal. Consequently, the power driving circuit receives a signal representing a power forced shutdown directly even when the shift of the power switch is not detected while none of the OS and application programs is running normally in the computer. The power voltage can thus be shut down forcibly.

The special key should preferably be a function key to be grounded when it is pressed. Notebook model computers are often provided with keys used for certain functions, as well as function keys to which the user can assign functions respectively. Those function keys include some keys that can output a signal to the computer body regardless of scanning of the key matrix. For example, there is a switch key that takes a fixed potential (a ground voltage and a predetermined level power voltage) when it is pressed. This key can be used together with a conventional key without using any special new key.

The power switch can further output a signal representing the status of a special key when it is shifted to the normal position. Such special keys as the conventional function keys, when the computer is powered, are often assigned to certain functions and other functions assigned by the user. Consequently, those special keys should be used as normal keys when not directed for a power forced shutdown. This is why each of those special keys can be used as normal keys when shifted to a normal position if it further outputs a signal representing the status thereof, that is, whether or not it is pressed when the power switch is shifted to the normal position.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
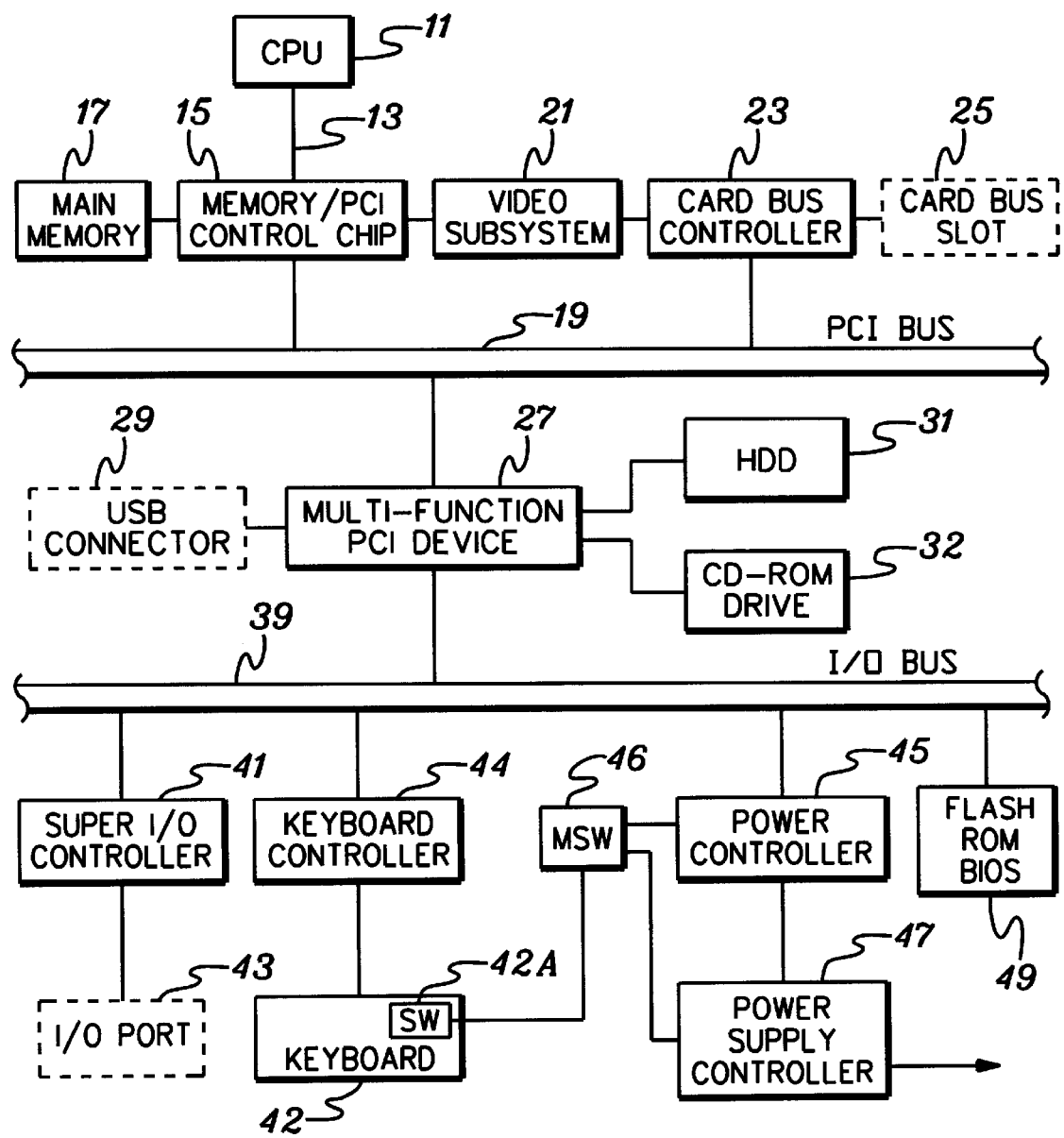
FIG. 1 is a schematic block diagram of a computer in an embodiment of the present invention.

FIG. 1 is an explanatory view of a hardware configuration of a typical notebook model personal computer 10 (see FIG. 4) for each subsystem in a preferred embodiment of the present invention. A CPU 11 executes various programs under the control of an OS. The CPU 11 is connected to a bridge circuit (host-PCI bridge) generally referred to as a memory/PCI control chip 15 via a system bus 13. The memory/PCI control chip 15 in this embodiment includes a memory/controller function for controlling the access to the main memory 17, as well as a data buffer for eliminating the difference in data transfer rate between the system bus 13 and the PCI bus 19.

The main memory 17 is a writable memory used as an area from which execution programs are read by the CPU 11 or a work area in which data processed by those execution programs are written. Execution programs mentioned here include such an OS as Windows98, various device drivers for operating peripheral devices, application programs dedicated to specific business works, and BIOS stored in a flash ROM 49. A video subsystem 21 is used to execute video-related functions. The video subsystem 21 includes a video controller that processes drawing instructions from the CPU 11 actually and writes processed drawing information in a video memory (VRAM) temporarily, as well as reads the drawing information from the VRAM and outputs the information onto a liquid crystal display (not illustrated) as drawing data.

A card bus controller 23 is a dedicated controller for linking a bus signal from the PCI bus 19 to an interface connector (card bus) of a PCI card slot 25. Both PCI bus 19 and I/O bus 39 are connected to each other via a multi-function PCI device 27. The multi-function PCI device 27 in this embodiment has a bridging function for bridging between the PCI bus 19 and the I/O bus 39, a DMA controller function, a programmable interrupt controller (PIC) function, a programmable interval timer (PIT)

function, an IDE (Integrated Drive Electronics) interface function, a USB (Universal Serial Bus) function, and an SMB (System Management Bus) interface function. For example, the card bus controller 23 may be a device referred to as PIIX4 supplied from Intel Corporation An IDE hard disk drive (HDD) 31, as well as an IDE CD-ROM drive 32 are connected to the IDE interface. Instead of the IDE CD-ROM drive 32, another type IDE unit, for example, a DVD (Digital Video Disc or Digital Versatile Disc) drive, may be connected to the IDE interface. Such external storages as HDD 31 and CD-ROM drive 32 are installed, for example, in places referred to "a media bay" or "a device bay" provided in the body of the system 10 respectively. Those external storages provided as standard are installed so as to be compatible with other devices including an FDD, a battery pack, etc. and exclusively sometimes.

The I/O bus 39 may be, for example, an ISA bus. A super I/O controller 41, a power controller 45, a flash ROM 49, a memory (so-called CMOS memory) 50, etc. are connected to the I/O bus 39. The super I/O controller 41 is a peripheral device controller for controlling driving of the floppy disk drive (FDD), input/output of parallel data (PIO) via a parallel port, and input/output of serial data (SIO) via a serial port. An I/O port 43 is connected to this controller 41. The power controller 45 is a single chip microcomputer used mainly for both power management and thermal management in the system. The controller 45 may be an H8/300 chip supplied from Hitachi, Ltd. The power controller 45 is provided with an MPU, a RAM, a ROM, a timer, etc. The ROM stores programs and reference tables necessary for both power management and thermal management. A power supply controller 47 is connected to the power controller 45.

The power supply controller 47 includes a battery charger and a DC/DC converter for generating a constant voltage of 5V, 3.3V, etc. used by the computer 10. The controller 47 controls the computer power directly under the control of the power controller 45. When the computer 10 can be supplied with a voltage from a battery mounted therein and via an AC/DC adapter, that is, when the computer can be supplied with a power voltage, this power supply controller 47 can keep the output of the constant voltage Vcc. This constant voltage Vcc is a power voltage used only for controlling the power controller 45, the power supply controller 47, etc. The Vcc needs only very slight power consumption.

The flash ROM 49 is a rewritable non-volatile memory for storing a code group (BIOS: Basic Input/Output System) for controlling input/output of each of such hardware units as a keyboard, a floppy disk drive (FDD), etc., as well as such firmware as a self-test program (POST: Power On Self Test) executed when the computer 10 is powered, etc. for ever.

In this embodiment, a keyboard controller 44 is connected to the I/O bus 39. And, a keyboard 42 attached to the computer body is connected to the keyboard controller 41. This keyboard 42 includes a plurality of keys. Some of those keys are combined to form a key matrix, which is scanned by the keyboard controller 44 so as to judge which key is pressed. The keyboard controller 44 can be configured by a single chip microcomputer and the configuration can be included in the above described H8/300 chip. Consequently, the power controller 45 and the keyboard controller 44, which are separated functionally from each other, can be identical in configuration.

The keyboard 42 includes a function key 42A that can output a signal to the computer body regardless of the scanning of the key matrix. This function key 42A is a switch key used, for example, for obtaining a certain potential (a ground voltage and a predetermined level power voltage) when it is pressed. The function key 42A can be assigned with directions to execute predetermined certain processings, as well as processings predetermined by the user. More concretely, the function key 42A is not a mere switch, but a key prepared beforehand to execute various functions in the computer.

This function key 42A is connected to a power switch 46 provided for the body of the computer 10. The power switch 46 is connected to both power controller 45 and power supply controller 47. The power switch 46, to be described later in detail, can be shifted between the normal position and a pointed position. Usually, the power switch 46 is a reset switch to be set to the normal position and after it is shifted to a pointed position, it is reset to the normal position. Both of the function key 42A and the power switch 46 take charge of part of the power forced shutdown function of the present invention. The operations of those switches 42A and 46 will be described later briefly.

In addition to those shown in FIG. 1, many more parts including an electric circuit, etc. are needed to compose the computer system 10. Because those parts are already well known by those in the art and they are not necessary for constructing the gist of the present invention, they are omitted in this specification. In addition, to simplify the drawings, only some of the connections between hardware blocks in each figure are shown. Hereunder, the relationship in connection between those blocks for realizing the power forced shutdown function of the computer 10 according to the present invention will be described in detail.

Figure 2:
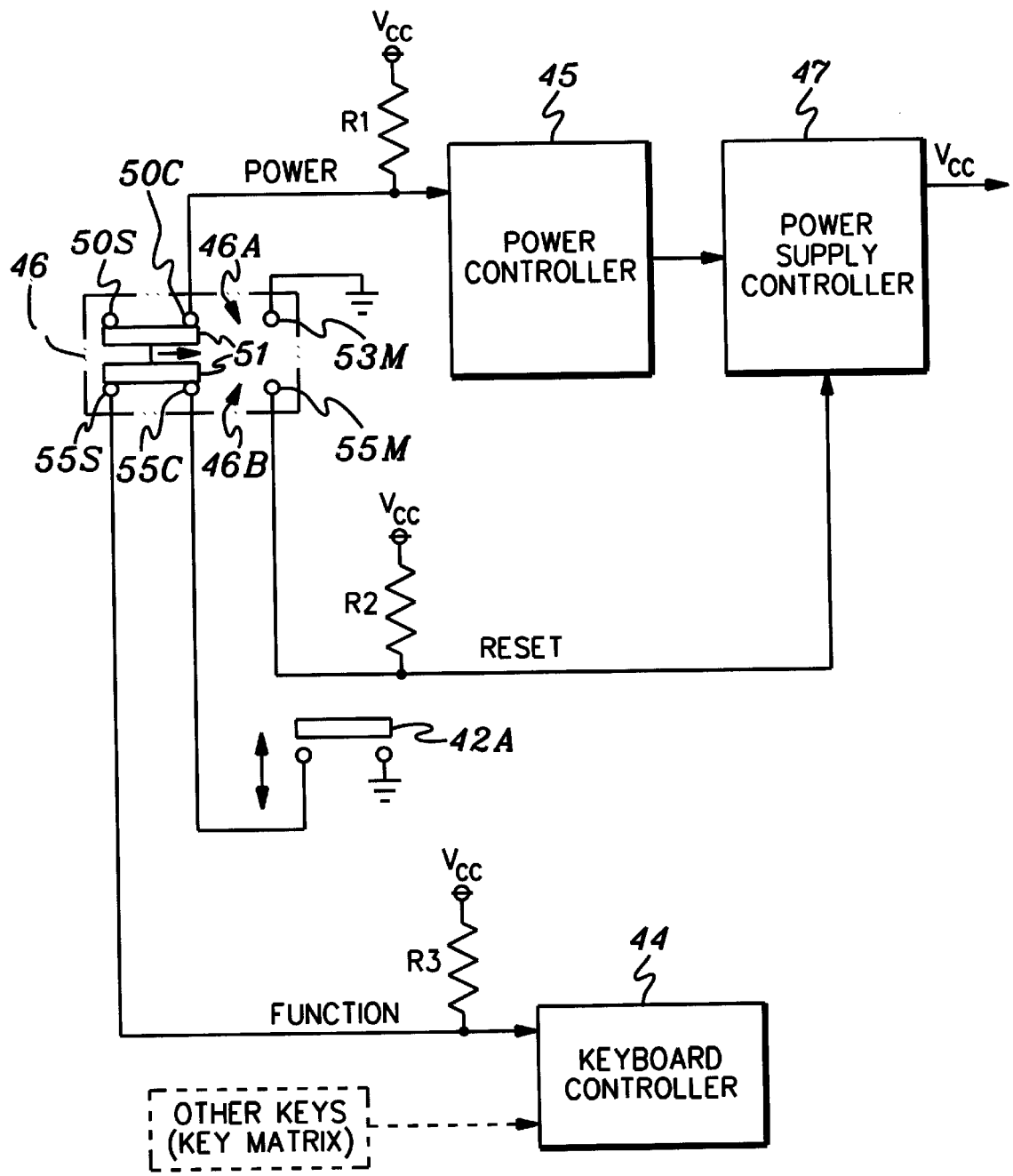
FIG. 2 is a schematic block diagram of the computer in the embodiment of the present invention, centering on the connections between components.

FIG. 2 is a block diagram of the computer 10 for realizing the power forced shutdown function in an embodiment of the present invention, centering on the connections between functional blocks. A power switch 46 includes circuit switches 46A and 46B, as well as a mover 51 for enabling the switch 46 to be shifted between the normal position and a pointed position. The switch 46A is provided with terminals 53S, 53C, and 53M. The switch 46B is provided with terminals 55S, 55C, and 55M. In this embodiment, the power switch 46 is a 2-circuit switch, but it may be a switch provided with three or more circuits. It is just required to have a plurality of circuits that are ganged with each other.

The power switch 46 is shiftable between the normal position and a pointed position as above described. When set at the normal position, the mover 51 of the switch 46 enables continuity between the terminals 53S and 53C of the switch 46A and the terminals 55S and 55C of the switch 46B respectively. When set at a pointed position, the mover 51 of the switch 46 enables continuity between the terminals 53C and 53M of the switch 46A and the terminals 55C and 55M of the switch 46B respectively. This power switch 46 is a reset switch that is always returned to the normal position from a pointed position. Usually, the switch 46 is set so as to enable continuity between the terminals 53S and 53C of the switch 46A and the terminals 55S and 55C of the switch 46B respectively.

The terminal 53M of the switch 46A is grounded and the terminal 53C is connected to the power controller 45. The terminal 55C of the switch 46B is connected to one end of the function key 42A and the other end of which is grounded. Pressing this function key 42A enables the terminal 55C of the switch 46B to be grounded. The terminal 55S of the switch 46B is connected to the keyboard controller 44 and the terminal 55M is connected to the power supply controller 47. The keyboard controller 44 is connected to a plurality of keys composing the key matrix so as to be enabled for scanning the key matrix. Each key input can thus be transmitted to the computer body.

A power supply for outputting a constant voltage Vcc is located between the terminal 53C of the switch 46A and the power controller 45 and is connected to both via a resistor R1. The status of this terminal 53C is used as a power signal representing a power-on or power-off command. The constant voltage Vcc is kept supplied to the computer while the computer is powered by its battery or via the AC/DC adapter. As long as a power voltage is supplied to the computer, therefore, the constant voltage Vcc is supplied to the terminal 53C via the resistor R1. Consequently, the power signal keeps its high level until the terminal 53C is connected to the grounded terminal 53M due to the mover 51 to be described later in detail. More concretely, when the power switch 46 is set at the normal position, the terminal 53C is connected to the terminal 53S by the mover 51. However, because the terminal 53S is not connected to any terminal at this time, the level of the terminal 53C becomes high, so that the constant voltage Vcc is supplied to the terminal 53C via the resistor R1. On the other hand, when the power switch 46 is set at a pointed position, the terminal 53C is connected to the terminal 53M by the mover 51, thus the terminal 53C is grounded and its level becomes low. These high or low level signal becomes a power signal to be entered to the power controller 45.

Because the power switch 46 is a reset switch, which is always returned to the normal position after it is shifted to a pointed position, the power signal from the power switch 46 becomes a low level pulse signal only when the power switch 46 is set to a pointed position. The power controller 45 detects the trailing from high level to low level (or from high level to low level) of the power signal, which becomes a pulse signal. Upon this detection, the power controller 45 turns on or off the power to the computer.

A power supply for outputting the constant voltage Vcc is located between the terminal 55S of the switch 46B and the keyboard controller 44 and is connected to both via a resistor R3. As above described, because the constant voltage Vcc is kept supplied to the object, the voltage Vcc is supplied to the terminal 55S via the resistor R3. The status of this terminal 55S is used as a function signal representing the status that the function key 42A is pressed. Concretely, when the power switch 46 is set at the normal position, the mover 51 enables the terminal 55S to be connected to the terminal 55C. The function key 42A is connected to the terminal 55C. While the function key 42A is not pressed, the level of the terminal 55S is high and when the key 42A is pressed, the level of the terminal 55S becomes low. On the other hand, when the power switch 46 is set at a pointed position, the mover 51 enables the terminal 55C to be connected to the terminal 55M. However, because the terminal 55S is not connected to any terminal at this time, the level of the terminal 55S is high. At this time, the constant voltage Vcc is supplied to the terminal 55S via the resistor R3. Those high level or low level signals become a function signal to be entered to the keyboard controller 44.

Consequently, the function signal becomes a pulse signal whose level becomes low only when the power switch 46 is set at the normal position and the function key 42A is pressed. The keyboard controller 44 detects the trailing from high level to low level (or from low level to high level) of the function signal that becomes a pulse signal. Upon this detection, the keyboard controller 44 notifies the computer of the status that the function key 42A is pressed.

A power supply for outputting the constant voltage Vcc is connected to between the terminal 55M of the switch 46B and the power supply controller 47 via the resistor R3. Also in this case, because the constant voltage Vcc is kept supplied to the object as above described, the constant voltage Vcc is supplied to the terminal 55M via a resistor R2. The status of this terminal 55M is used as a reset signal representing a power forced shutdown command. Concretely, when the power switch 46 is set at the normal position, the terminal 55M is not connected to any terminal. The level of the terminal 55M is thus high while the constant voltage Vcc is supplied to the terminal 55M via the resistor R2. On the other hand, when the power switch 46 is set at a pointed position, the mover 51 enables the terminal 55M to be connected to the terminal 55C. The function key 42A is connected to the terminal 55C and while the function key 42A is not pressed, the terminal 55C is not connected and the level of the terminal 55M becomes high. When the function key 42A is pressed, the terminal 55C is grounded by the function key, thus the level of the terminal 55M becomes low. These high and low level signals become reset signals to be entered to the power supply controller 47.

Consequently, the reset signal becomes a pulse signal whose level becomes low only when the power switch 46 is set at a pointed position and the function key 42A is pressed. The power supply controller 47 detects the trailing from high level to low level (or from low level to high level) of the reset signal that becomes a pulse signal. Upon this detection, the power supply controller 47 detects that a power forced shutdown command has been issued, thereby shutting down the power forcibly, that is, executing a power forced shutdown processing for the computer.

In this embodiment, the computer is composed so as to enable the power supply controller 47 to shut down the power voltage forcibly in response to the reset signal representing the status of the terminal 55M, that is, whether or not the terminal 55M is grounded, regardless of the operation of any of the OS and application programs. Concretely, the power supply controller 47 can shut down the power to the computer in response to the reset signal independently of other components.

The keyboard controller 44 detects the function signal representing the status of the terminal 55S of the switch 46B (that is, whether or not the terminal 55S is grounded), thereby detecting a normal function command issued from the function key 42A, which is not included in the key matrix.

The power controller 45 detects the power signal representing the status of the terminal 53C of the switch 46A (that is, whether or not the terminal 53C is grounded), thereby detecting a power-on or power-off command issued by the power switch 46. In this embodiment, the power switch 46 is not connected to the computer power supply. According to the status of the power switch 46, a command is issued to power on or power off for the computer. Receiving this power-on or power-off command, the power supply controller 47 turns on or shuts down the power to the computer. If the OS or an application program is used to manage the power supply of the computer, the power supply can also be turned on and shut down directly without use of the power switch 46. Concretely, the power supply controller 47 is running as above described so as to monitor the status of the power switch 46. The power supply controller 47 receives a pulse signal (power signal) issued in response to the shift of the power switch 46 from the normal position to a pointed position so as to manage the power supply of the computer. For example, if the power switch 46 is shifted from the normal position to a pointed position while the power is on, the power is shut down. While the power is off, the power is turned on. If the OS or an application program is used to manage the power supply, for example, if the computer can enter such an energy-saving mode as standby, etc., then the power switch 46 is set at the normal position while the power is on. However, if the computer enters the energy-saving mode in response to a signal equivalent to the power signal issued from the OS or application program to the power supply controller 47.

In this embodiment, therefore, the status of the computer is expected to be changed as follows according to whether the power switch 46 is set at the normal position or at a pointed position. When the switch 46 is set at the normal position; (1) the power is being shut down, (2) the power is being turned on (the computer operation is enabled), and (3) the computer is in the energy-saving mode. On the other hand, when the power switch 46 is set at a pointed position; (1) a, power-on command is issued while the power is off, (2) a power-off command is issued while the power is on (the computer operation is enabled), and (3) a power shutdown (status reset) command is issued in the energy-saving mode.

Figure 3A:
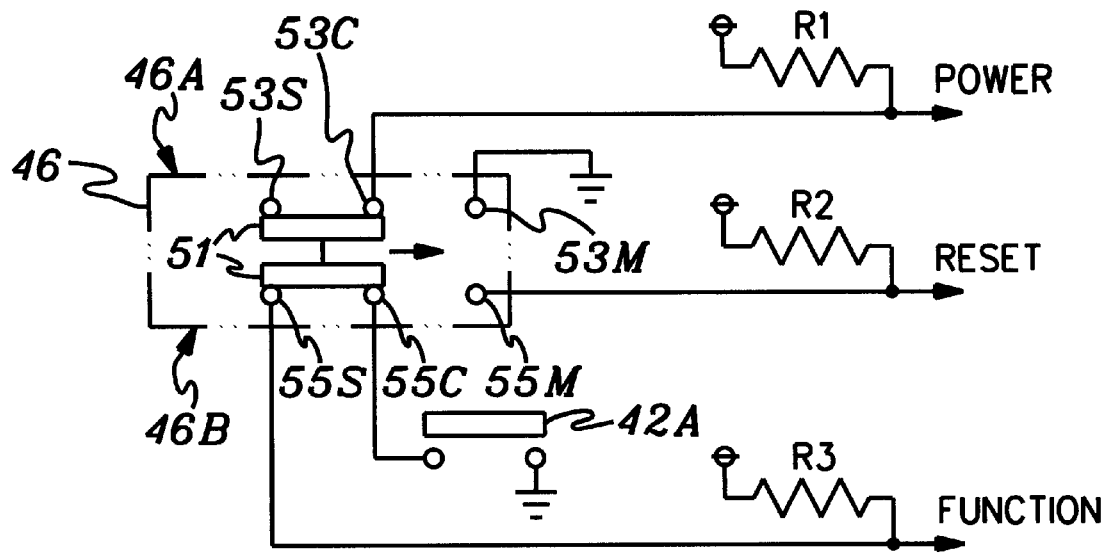
FIG. 3 is charts for briefly describing the power forced shutdown function of the computer of the present invention with use of signals representing the status of the power switch and the status of the function key.
Figure 3B:
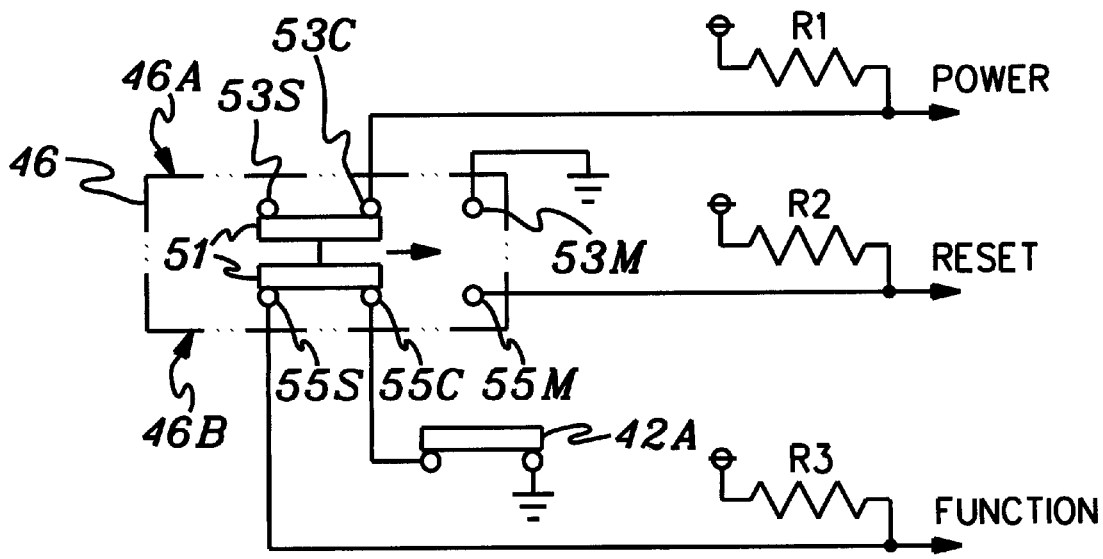
Figure 3C:
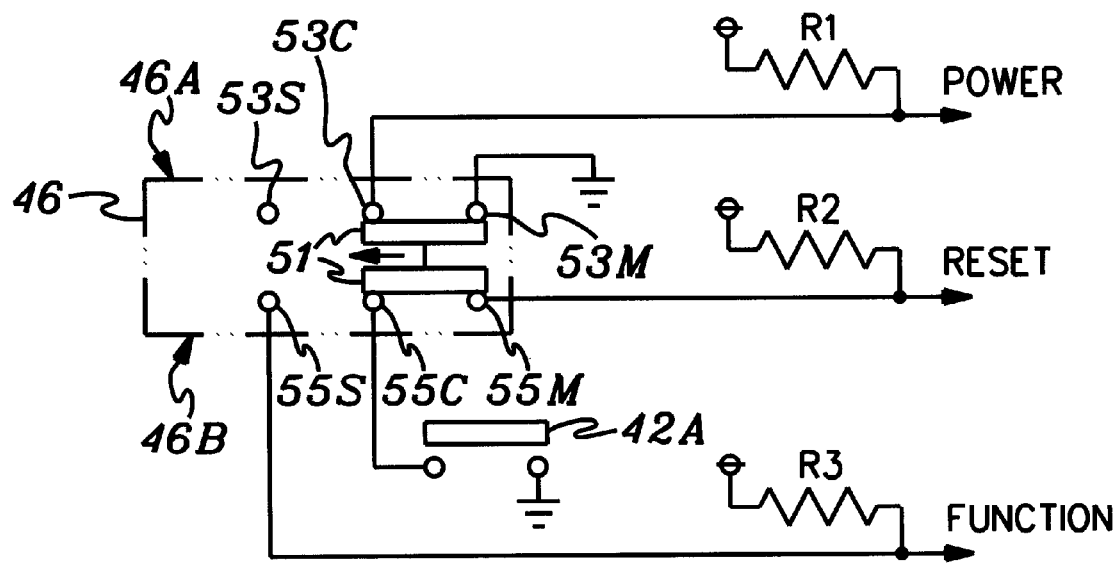
Figure 3D:
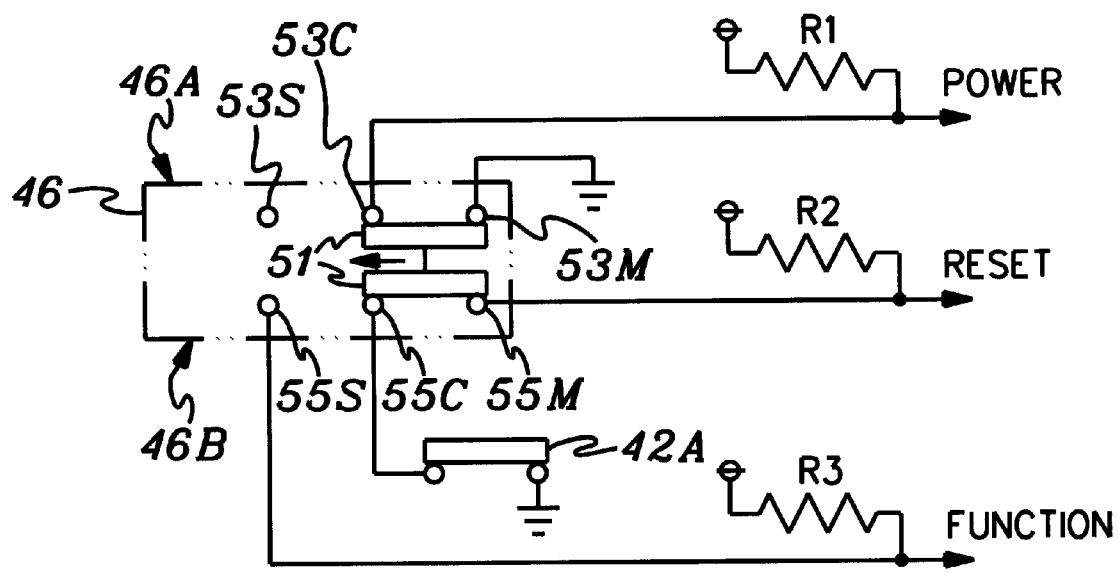

Next, a description will be made for the outline of the power forced shutdown function of the computer according to the present invention together with the operations of both power switch 46 and function key 42A. FIG. 3 shows the status of the function key 42A when it is pressed and not pressed at the normal position and a pointed position of the power switch 46 respectively. FIG. 3(A) shows the status of the function key 42A when it is not pressed while the power switch 46 is set at the normal position. FIG. 3(B) shows the status of the function key 42A when it is pressed while the power switch 46 is set at the normal position. FIG. 3(C) shows the status of the function key 42A when it is not pressed while the power switch 46 is set at a pointed position. FIG. 3(D) shows the status of the function key 42A when it is pressed while the power switch 46 is set at a pointed position.

In FIG. 3(A), the power switch 46 is set at the normal position and the function key 42A is not pressed. This status means that the computer 10 is operating, the computer 10 is in such an energy-saving mode as standby, or the power of the computer 10 is shut down. At this time, each of the power, reset, and function signals is on the high level. Those signals are thus not detected (they are detected only at the trailing to the low level respectively). Consequently, one of the above described statuses (in operation, being in an energy-saving mode such as standby, or in the shutdown status) is kept in the computer 10.

If the function key 42A is pressed at this time as shown in FIG. 3(B), the terminal 55C is grounded and the function signal is grounded via the mover 51, that is, it becomes a low level signal. If the power switch 46 is set at the normal position such way, only the function key 42A is validated. Consequently, the keyboard controller 44 can detect that the function key 42A is pressed while the computer 10 is operating or in such an energy-saving mode as standby. Consequently, it is possible to use a function defined for the function key effectively.

As shown in FIG. 3(C), if the power switch 46 is shifted from the normal position to a pointed position, the terminal 53C is grounded. The power signal is thus grounded via the mover 51. In other words, it becomes a low level signal. And, the power controller 45 detects a low level power signal, thereby detecting that a power-on or power-off command has been issued. When the power switch 46 is set at a pointed position such way, only the power signal representing a power-on or power-off command is validated.

Consequently, the power controller 45 outputs a power-off command to the power supply controller 47 so that the power to the computer is shut down when the power is on or outputs a power-on command to the power supply controller 47 so that the power is turned on when the power is shut down.

At this time, the function key 42A is not pressed yet and the terminals 55C and 55S are not connected to each other in FIG. 3(C), so each of the reset and function signals is on the high level. Therefore, those signals are not detected. Consequently, only the power signal representing a power-on or power-off command is validated when the power switch 46 is shifted from the normal position to a pointed position.

As shown in FIG. 3(D), if the function key 42A is pressed while the power switch 46 is shifted to a pointed position, the terminal 55M is grounded via the mover 51. The reset signal is thus grounded. In other words, it becomes a low level signal. And, the reset signal is validated only when the function key 42A is pressed while the power switch 46 is set at a pointed position such way. Consequently, the reset signal can be validated when the function key 42A is pressed while the terminal 53C of the power switch 46 is moved to a position where the terminal 53C is directed so as to be grounded even when the OS or application program goes out of control (abnormal status) while the computer 10 is operating or in such an energy saving status as standby. If the reset signal is validated by converting the power switch 46 to a pointed position and by pressing the function key 42A, then the power supply controller 47 can be controlled independently of other components, thereby the power supply of the computer can be shut down forcibly even when the computer runs away out of control.

In this embodiment, therefore, a switch circuit is composed so that the power switch 46 and the function key 42A are connected serially, thereby the power of the computer can be shut down forcibly. Thus, an existing function key 42A can be employed as a reset switch, thereby the reset switch can be omitted. The apparatus can thus be more simplified in structure.

Furthermore, because the reset signal can be validated only when the function key 42A is pressed while the power switch 46 is shifted to a pointed position, power forced shutdown directing can be avoided even when the function key 42A is pressed by mistake.

Furthermore, while the power switch 46 is set at the normal position, only the function key 42A is validated, the function key 42A can work normally while the computer 10 is operating normally. Consequently, the user can operate the function key 42A without considering the status of the function key 42A.

Figure 4:
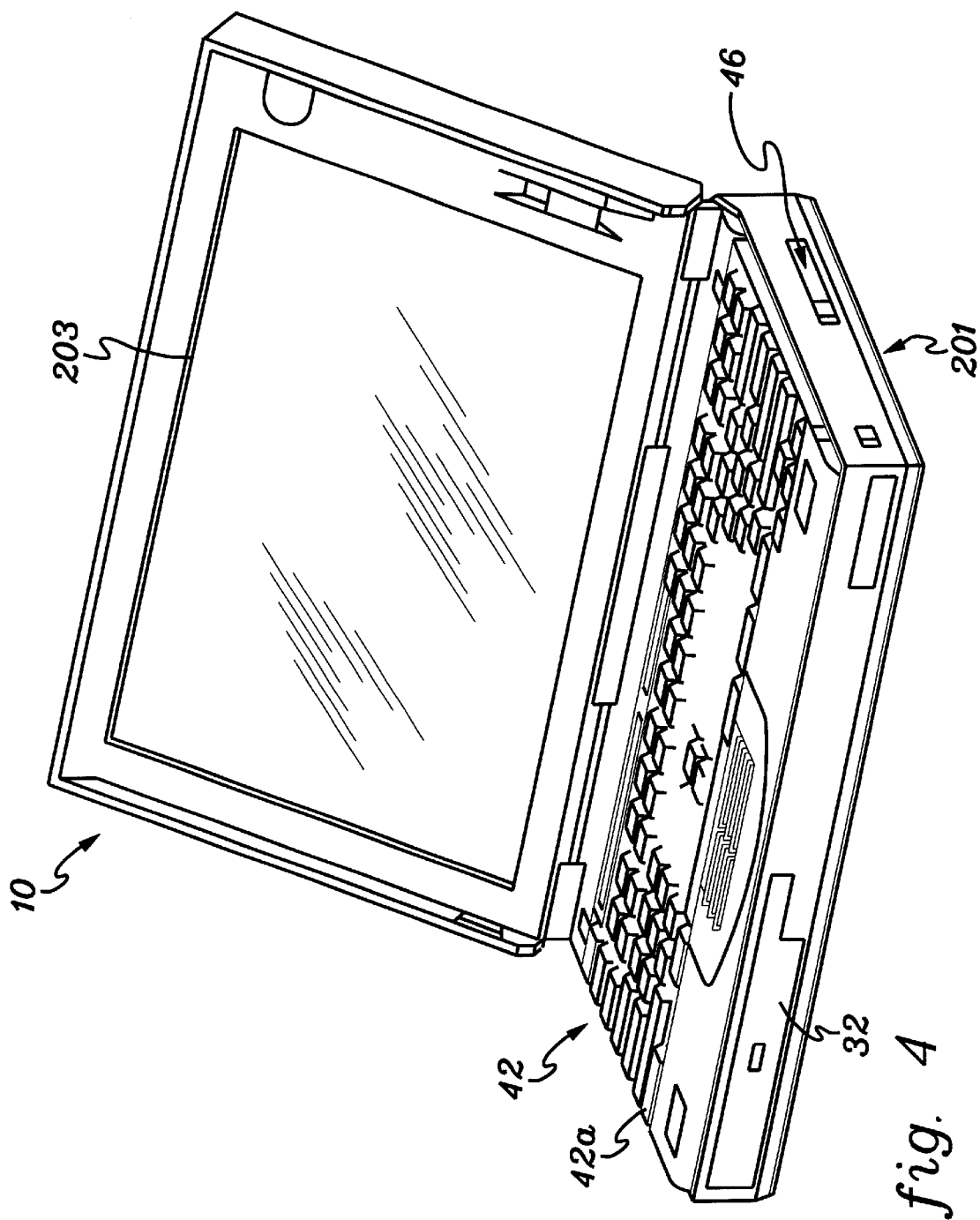
FIG. 4 shows an external view of the computer that realizes the present invention.

FIG. 4 shows an external view of the computer 10 that realizes the present invention. The computer 10 includes a body 201 for housing the components shown in FIG. 1, a liquid crystal display 203, a keyboard 42 mounted on top of the body 201, a function key 42A included in the keyboard, a CD-ROM drive 32, and a power switch 46. The computer 10 does not have any special characteristics in its external view with respect to this embodiment.

Although a description has been made for a case in which a function key is employed as a special key, the present invention is not limited only to that. Another key included in the keyboard may also be used as the special key. The present invention, which has been described in specific embodiments, may be varied freely without departing from the spirit and scope of the invention, of course.

As above described, according to the present invention, a special key is pressed while the power switch is shifted to a pointed position, thereby a power forced shutdown signal can be output. In addition, a power forced shutdown signal is entered directly to a power circuit even when none of the OS and application programs is running normally in the computer, thereby the power to the computer can be shut down.

Furthermore, because the power circuit is composed independently of the logic circuit that outputs a signal for directing power-on or power-off of the power voltage and the power driving circuit that supplies or shuts down the power voltage, a power forced shutdown signal can be entered directly to the power driving circuit even when shift of the power switch cannot be detected, thereby the power to the computer can be shut down forcibly.

Furthermore, because a function key that assumes a constant potential when it is pressed is employed as a special key, an existing key can be used together with the function key. There is thus no need to provide the keyboard with a special new key.

Furthermore, because the power switch, when shifted to the normal position, can output a signal representing the status of a special key, that is, a signal representing whether or not the key is pressed, can be output when the power switch is shifted to the normal position, thereby the power switch can be used as a normal key when it is set at the normal position.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer, provided with a power forced shutdown function, having a keyboard and a keyboard controller, the keyboard controller transforming a signal generated through scanning of a key matrix, including a plurality of predetermined keys, to a key code and transferring the key code to a processor in a power-on status, the computer comprising:

a power switch shiftable between a normal position and a pointed position, the switch outputting a signal representing a turn-on or a turn-off of the computer in response to a shift of the power switch to the pointed position;

a power circuit supplying or intercepting power voltage in response to the signal transferred from the power switch; and a special key being excluded from the key matrix and being included in the keyboard, the key outputting a signal representing a power forced shutdown by being depressed in conjunction with the shift of the power switch to the pointed position.

2. The computer provided with a power forced shutdown function according to claim 1, wherein the power circuit has a logic circuit outputting an instruction signal to supply or intercept the power voltage in response to the signal from the power switch, and a power driving circuit generating the power voltage and supplying or intercepting the power voltage in response to the instruction signal, wherein the signal representing the power forced shutdown is input to the power driving circuit.

3. The computer provided with a power forced shutdown function according to claim 2, wherein the special key is a function key being grounded in conjunction with depression thereof.

4. The computer provided with a power forced shutdown function according to claim 3, wherein the power switch further outputs a signal representing the status of the special key when shifted to the normal position.

5. The computer provided with a power forced shutdown function according to claim 2, wherein the power switch further outputs a signal representing the status of the special key when shifted to the normal position.

6. The computer provided with a power forced shutdown function according to claim 1, wherein the power switch further outputs a signal representing the status of the special key when shifted to the normal function.

7. The computer provided with a power forced shutdown function according to claim 1, wherein the special key is a function key being grounded in conjunction with depression thereof.

* * * * *

UNITED STATES PATENT AND TRADEMARK OFFICE
CERTIFICATE OF CORRECTION

PATENT NO. : 6,625,739 B1
DATED : September 23, 2003
INVENTOR(S) : Kobayashi

It is certified that error appears in the above-identified patent and that said Letters Patent is hereby corrected as shown below:

<u>Title page,</u>
Item [54], Title, delete "HARD POWER SHUTDOWN OF A COMPUTER BY ACTUATING BOTH A KEYBOARD CONTROLLER INDEPENDENT KEY AND A SOFT POWER SWITCH TOGETHER TO BYPASS THE POWER SWITCH TOGETHER TO BYPASS THE POWER CONTROLLER" and insert -- HARD POWER SHUTDOWN OF A COMPUTER BY ACTUATING BOTH A KEYBOARD CONTROLLER INDEPENDENT KEY AND A SOFT POWER SWITCH TOGETHER TO BYPASS THE POWER CONTROLLER --

Signed and Sealed this

Twenty-third Day of December, 2003

JAMES E. ROGAN
*Director of the United States Patent and Trademark Office*